April 16, 1935.  C. A. STYER  1,997,659
GAS CONCENTRATION INDICATOR
Filed July 22, 1929
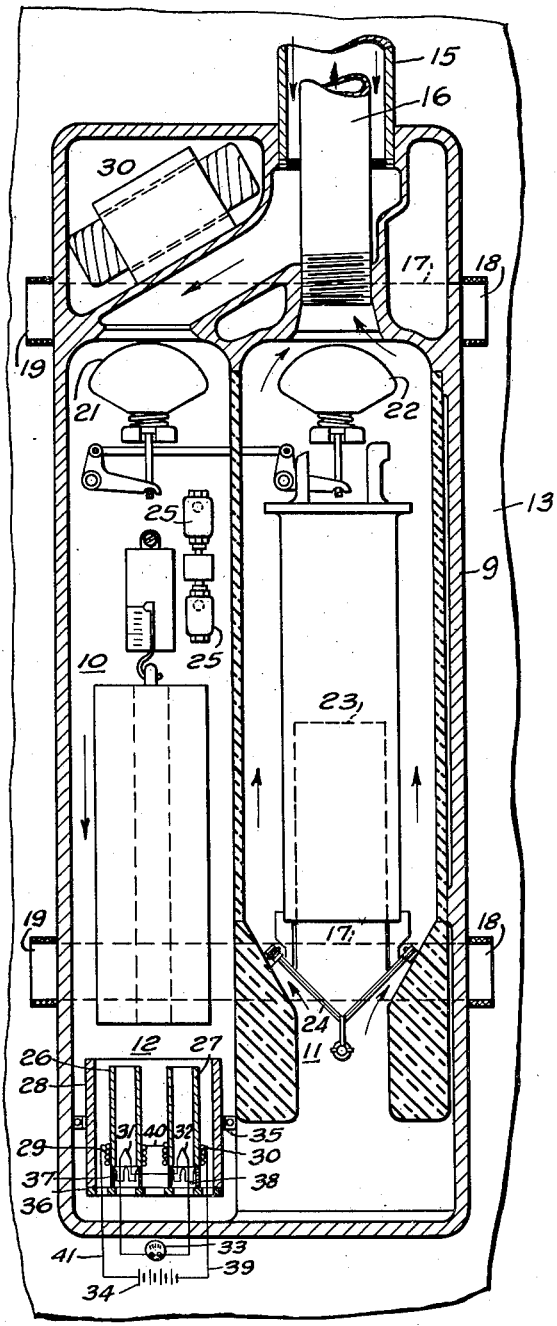
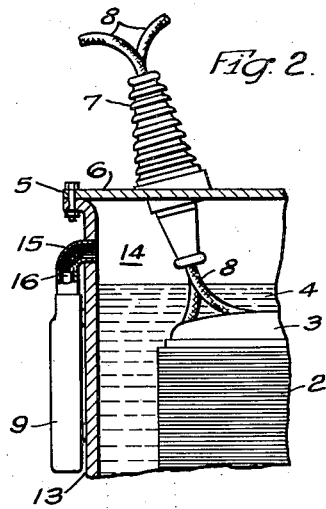
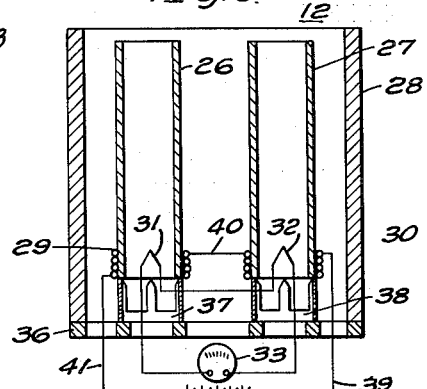
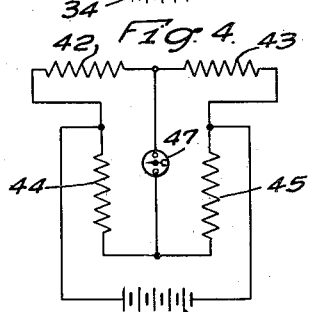
INVENTOR
Charles A. Styer.
BY
ATTORNEY Patented Apr. 16, 1935

1,997,659

UNITED STATES PATENT OFFICE 1,997,659

GAS CONCENTRATION INDICATOR

Charles A. Styer, Forest Hills, Pa., assignor to Westinghouse Electric & Manufacturing Company, a corporation of Pennsylvania Application July 22, 1929, Serial No. 379,974

9 Claims. (Cl. 23—232)

My invention relates to means for indicating the intensity of a chemical reaction, to thereby indicate the concentration of one of the reacting substances. My invention has application to indicate the proportion of oxygen present within the tank of an inert gas transformer.

In certain types of electrical apparatus, such as inert-gas cushioned transformers, the apparatus is contained in a tank immersed in oil, and an atmosphere devoid of oxygen is maintained above the oil, thus preventing the formation of explosive mixtures of the more volatile portions of the oil with oxygen, and also preventing the oxidation of the oil and the formation of sludge. It is common practice in transformers of this type to provide means for deoxidizing the atmosphere above the oil.

In order to determine whether the deoxidizing mechanism is operating satisfactorily, it is ordinarily necessary to make periodic analysis of the gaseous mixture of the atmosphere above the oil to determine the percentage of oxygen contained therein. Such analysis of the gaseous mixture requires considerable apparatus, and a skilled analyst not always readily available about transformer stations. This method of determining the oxygen content of the gaseous mixture has the added limitation that no indication is given between the test periods.

An object of my invention is to provide for a continuous indication of the concentration of a reactive substance in a gaseous mixture.

Another object of my invention is to provide a device for measuring the concentration of oxygen within a sealed casing where oxygen-free atmosphere is desired.

In practicing my invention, I provide a body of oxidizable material, for example, carbon, exposed to the gaseous mixture and maintained at a sufficiently high temperature so that it will react with any oxygen that may be present. From experiment, it has been found that a temperature of the order of 325° C. will keep the carbonaceous material in a satisfactorily reactive condition. I also provide a non-reactive body or one that is inert to oxygen, and heat it to the same temperature as the reactive body or a proportional part thereof. The difference in the temperature of these two bodies is measured by means of thermo-couples and is a measure of the heat of chemical reaction of the reactive body which is dependent upon the percentage of oxygen contained in the mixture.

The equipment for indicating the gas concentration may be placed in the transformer casing above the oil, or in any other convenient location where the gaseous mixture will come in contact with the carbon.

For the purpose of illustration, I have shown the indicating equipment in a cabinet containing deoxidizing and dehydrating equipment and attached to the transformer casing, the details of which are set forth in my copending application, Serial No. 267,789, filed April 5, 1928 and assigned to the Westinghouse Electric & Manufacturing Company. The indicating equipment may be located any place in the cabinet. It is not fatal to my invention to locate it in a place other than that illustrated.

My invention will be better understood by reference to the accompanying drawing, in which Figure 1 is a vertical section of a cabinet containing deoxidizing and dehydrating equipment, and one embodiment of my invention;

Fig. 2 is a view partly in elevation and partly in section of the cabinet connected to a transformer;

Fig. 3 is a schematic view of apparatus and circuits employed in one embodiment of my invention;

Fig. 4 is a schematic view showing apparatus and circuits employed in another embodiment of my invention.

Referring to Fig. 2 of the drawing, a portion of a transformer is shown in cross-section. A core member 2 having windings 3 wound thereon is submerged in insulating oil 4 contained in a sealed transformer casing 5. The casing includes a cover 6 through which an insulating bushing 7 extends for conducting the leads 8 therethrough.

A box or cabinet 9 containing the dehydrating, deoxidizing and oxygen indicating equipments 10, 11 and 12, respectively, is mounted on the side 13 of the transformer casing 5, at a height to be easily accessible, and is connected to the gas cushion 14 above the level of the oil 4 by means of pipes 15 and 16. The cabinet 9 may be mounted in any suitable manner on the side 13 of the transformer casing 5. As illustrated in the drawing, the back of the cabinet 9 may be welded to two retaining straps 17, that are, in turn, welded at the ends 18 and 19 thereof, to the side 13 of the transformer casing 5.

The gas is caused to continuously circulate and recirculate, in a manner hereinafter described, from the space 14 above the oil 4 through pipe 15, through the dehydrating equipment 10, the oxygen indicating equipment 12, the deoxidizer 11 and through pipe 16 to the space 14 above the oil. The flow of gas in and out of cabinet 9 is controlled by mushroom valves 21 and 22, respectively.

The dehydrator 10 contains suitable chemical material, such as calcium chloride, for removing water from the air or gas drawn into the cabinet 9 during the process of inbreathing.

The deoxidizer 11 contains a block of deoxidizing material 23 of specially prepared carbon, part of the surface of which is held at a sufficiently high temperature to cause a reaction between the carbon and any oxygen that may be present in the gases. The block 23 rests upon an electrically heated V-shaped grid 24 and feeds downwardly by gravity as it is oxidized away at the bottom.

The details of construction and operation of the deoxidizer and the operation of the mushroom valves constitute the subject matter of my above-mentioned copending application.

Breathing seals 25 are provided for expelling or taking in air, depending upon the pressure of the gases. The breathing seals may constitute any suitable type, but I prefer that they be made as described in U. S. Letters Patent No. 1,601,308 which issued on September 28, 1926, to Leland H. Hill and was assigned to the Westinghouse Electric & Manufacturing Company.

The oxygen indicating equipment comprises a body of carbonaceous material 26 and a body of non-reactive material 27 that are contained in a shielding vessel 28, a heating coil 29 for keeping the carbonaceous body at a temperature sufficiently high to be in a condition to react with any oxygen that may be present in the circulating gases, and a heating coil 30 for heating the non-reactive body to a temperature equal to that of the reactive body 26 or to a proportional part of such temperature. The equipment also consists of thermo-couples 31 and 32 that are in proximity to the reactive and non-reactive bodies, respectively, and are connected in voltage opposition through a voltmeter or potentiometer 33. One thermo-couple 31 which is designated as the reactive couple is supported in the hollow portion of the carbon stick. The other thermo-couple 32 designated as the inert couple is supported in the hollow portion of the non-reactive body. The energy for heating the heater coils 29 and 30 is supplied from a source of electrical energy 34.

The shielding vessel 28 is made of such material and is so arranged about the reactive and non-reactive bodies, that they are affected to the same degree by any external thermal disturbance. The shielding vessel 28 is placed in the direct path of the circulating gases and is held by a supporting member 35. A spider member 36, of such character as to allow free passage of the gases, is attached to the bottom of the vessel 28 to hold supports 37 and 38 for the reactive body 26, the non-reactive body 27 and their associated heating coils 29 and 30, respectively.

The carbonaceous body 26 may be of any convenient form, but I prefer to employ a molded hollow stick of carbon. This stick rests on the support 37 that is held by the member 36. The heating element 29 surrounds the lower portion of the stick and heats it to a suitable reactive temperature.

The non-reactive body 27 is designed to have the same thermal emissivity and conductivity as the active body 26, and may be formed from one of a number of suitable materials such as fired soapstone or a specially prepared porous ceramic material. The body 27 rests on the support 38 that is held by the member 36 and preferably its configuration is similar to that of the carbon stick 26. The heating coil 30 is disposed about its lower portion and electrically heats it by carrying the same current as the heater 29 or a proportional part thereof by being subject to the same or a proportional part of, the voltage that is impressed across the terminals of the heater 29. The circuit for the heating coils 29 and 30 may be traced from the energy source 34 through conductor 39, heater 30, conductor 40, heater 29 and conductor 41 to the energy source 34.

This thermal relation is necessary in order that the rate of generation of heat from electrical energy in the heater 30 will always be proportional to that of the heater 29. By the proper selection of materials, their size and condition of the external surface, the non-reactive body 27 and its heater 30 are so made as to have the same thermal time constant as the combination of the heater 29 and the carbon stick 26. The thermal time constant may be defined as the ratio of heat storing capacity to heat dissipating capacity. The non-reactive body may have any convenient dimensions, but it is preferably small so as to require little energy to maintain it at the desired temperature.

The operation of my system is as follows:

The gas is heated by the electrically heated hot wires of the V-shaped grid 24 and such gas is thereby decreased in density and rises, as indicated by the arrows, through pipe 16 to the space 14 above the oil 4, and displaces from that region a cooler stream of gas downwardly through pipe 15. As this cooler portion of gas comes into contact with the electrically heated grid 24, it in turn will be decreased in density and rise. In this manner the gas is continually recirculated.

As the gas circulates and recirculates, any moisture present will be absorbed by the dehydrator 16, and any oxygen will combine with the carbon 23 and form carbon dioxide.

If the thermal time constants of the reactive and non-reactive bodies are equal, and the ratio of the heating rates of both are equal, the temperature changes of the reactive and non-reactive elements, due to any variation which may occur in the heating current, will always be proportional to one another. Further, if the design of the heater 30 is so related to the non-reactive body 27, that the final steady temperature assumed by the non-reactive body is the same as the temperature of the carbon stick 26 when there is no gas present which will react with the carbon, then there will be no resultant electromotive force in the thermo-couple circuit and, consequently, no deflection or indication of the voltmeter.

If there is any oxygen present, some of it will come in contact with the heated carbon 26 and react therewith, thereby liberating heat which will raise the temperature of the reactive couple above that of the inert couple and a difference of potential will exist between the two thermo-couples and a current will flow from the higher to the lower potential, and will be indicated on the voltmeter 33. The amount of temperature elevation of the reactive couple will vary with the amount of oxygen present, and consequently the thermal electro-motive force may be used as a measure of the amount of oxygen present.

In the modified form of my invention illustrated in Fig. 4, I employ a plurality of resistors 42, 43, 44 and 45 connected together substantially in the form of a Wheatstone bridge. The two branches of the bridge are supplied with energy from any convenient source such as a battery 46, and there is also a suitable indicator such as a galvanometer 47 connected across the branches of the bridge to indicate any difference in the voltage drops across the branches.

The arms 42 and 43 of the bridge are substituted for the thermocouples 31 and 32, respectively, employed in the embodiment illustrated in Fig. 3. The resistors 42 and 43 are made of material having a positive temperature coefficient, that is, the resistance increases with an increase in temperature. The resistors 44 and 45 are preferably made of a material having a negligible temperature coefficient of resistance. The resistors 44 and 45 are so adjusted that when the reactive body 26 and the inert body 27 are in a balanced thermal relation the indication of the galvanometer will be zero.

The operation of the form of my invention illustrated in Fig. 4 is as follows:

Any oxygen present will react with the carbon stick as described in the embodiment illustrated in Fig. 3, thereby generating heat which will raise the temperature of the resistance arm 42 above that of the arm 43 and increasing its resistance. Such an increase in resistance will increase the voltage drop across the resistor and result in an unbalancing of the bridge. This unbalancing will be indicated by the galvanometer which will measure the difference of potential across the two branches of the bridge. The increase in temperature and the resistance of the arm are functions of the heat of reaction which depends upon the presence of oxygen in the gas. The galvanometer may be so calibrated as to indicate the percentage of oxygen present.

While I have described my system as applied to the detection of oxygen in a sealed transformer tank, it is evident that by proper substitution of the reacting material the presence of other gases may be similarly detected.

Since many modifications, within the spirit and scope of my invention, will occur to those skilled in the art, I do not wish to be limited, otherwise than by the scope of the appended claims.

I claim as my invention:

1. In a device for indicating the concentration of a constituent gas of a gaseous mixture, a substance contained in said device that is chemically reactive with respect to said gas, a substance contained in said device that is chemically inert with respect to said gas, means for heating said substances to maintain a predetermined temperature relation therebetween, when no chemical reaction takes place between said gas and said reactive substance, and means responsive to a change in the temperature relation of said two elements for measuring the rate of chemical action between said gas and said reactive substance.

2. A gas detector comprising a solid carbonaceous material capable of reacting when at a certain temperature with a given gas, a body inert to said gas, means for heating the carbonaceous material and the inert body to maintain them in a balanced thermal relation, and means for indicating a disturbance of this balance resulting from a reaction between said gas and the carbonaceous material.

3. In combination, a body adapted to react with a given constituent gas of a gaseous mixture only when said body is at a certain temperature, a heater to maintain said reactive body at the certain temperature, an inert body, means for heating said inert body proportionally to the heating of the reactive body to produce a balanced thermal condition therebetween, the inert and reactive bodies disposed in said vessel and said vessel disposed in the gaseous mixture, and means for indicating any change in the thermal balance due to the heat of reaction between said gas and the reactive body.

4. Means for detecting the presence of a certain gas in a gaseous mixture, comprising a body adapted to react at an elevated temperature with said gas, an inert body, heating means for normally maintaining a predetermined balanced temperature relation between said bodies, a thermo-couple having two active elements, one of said elements being disposed in proximity to said reactive body and the other element disposed in proximity to the inert body, and an indicator therebetween to indicate any variation in the predetermined temperature relation caused by the heat of reaction between the gas and the reactive body.

5. In combination, a vessel, a solid carbonaceous material disposed therein, capable, when at an elevated temperature, of reacting with a given gas, a body inert to said gas also disposed in said vessel, means for normally maintaining the reactive material and inert body in a balanced thermal relation, and means for indicating a disturbance of this relation as an indication of the presence of said gas.

6. The method of indicating the presence of oxygen in an atmosphere, which consists in passing said atmosphere adjacent to heated carbon in a confined space, and in measuring the heat of reaction between said carbon and said oxygen.

7. Means for indicating the proportion of oxygen in an atmosphere, comprising, in combination, a carbon stick disposed in said atmosphere, an inert body, a vessel disposed about said carbon stick and said inert body, means for heating the inert body and the carbon stick in a balanced thermal relation, a thermo-couple having two active elements disposed in proximity to the carbon and the inert body, respectively, and having an indicator connected therebetween for indicating the heat of chemical reaction as a measure of the quantity of oxygen present.

8. Means for detecting the presence of oxygen in an atmosphere, comprising in combination, a vessel disposed in said atmosphere, a moulded hollow carbon stick suitably disposed in said vessel, means for maintaining the carbon in a heated condition to react with said gas, an inert body also disposed in said vessel, means for maintaining the inert body in a balanced thermal relation with the carbon, a plurality of resistors, a source of electro-motive force, and an indicator connected substantially in the form of a Wheatstone bridge, two resistors of the bridge being disposed in proximity to the carbon and to the inert body, respectively, for indicating the heat of reaction of the carbon and the oxygen as a measure of the oxygen present.

9. The method of detecting the presence of a constituent gas in a gaseous mixture, which consists in passing said mixture in contact with a body that is chemically reactive with respect to said constituent gas and in contact with a body that is chemically inert with respect to said constituent gas, heating said bodies to a predetermined thermal relation, and observing variations from the predetermined thermal relation caused by chemical action between the constituent gas and the reactive body.

CHARLES A. STYER.